US010687169B2

(12) United States Patent
Graham et al.

(10) Patent No.: US 10,687,169 B2
(45) Date of Patent: *Jun. 16, 2020

(54) ELIMINATING FALSE POSITIVES OF NEIGHBORING ZONES

(71) Applicant: INTERNATIONAL BUSINESS MACHINES CORPORATION, Armonk, NY (US)

(72) Inventors: Ryan M. Graham, Durham, NC (US); Jeremy Greenberger, San Jose, CA (US); Ciaran Hannigan, Morrisville, NC (US); Matthew J. Margolis, Raleigh, NC (US); Kevin Roisin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,234

(22) Filed: Sep. 16, 2019

(65) Prior Publication Data

US 2020/0015036 A1 Jan. 9, 2020

Related U.S. Application Data

(63) Continuation of application No. 16/144,306, filed on Sep. 27, 2018, which is a continuation of application
(Continued)

(51) Int. Cl.
*H04W 4/021* (2018.01)
*H04W 4/02* (2018.01)
(Continued)

(52) U.S. Cl.
CPC ............ *H04W 4/021* (2013.01); *G06N 20/00* (2019.01); *H04M 1/7253* (2013.01);
(Continued)

(58) Field of Classification Search
CPC ......... G05D 1/0088; G05D 2201/0213; G05D 1/0027; G05D 1/0297; G05D 1/0276;
(Continued)

(56) References Cited

U.S. PATENT DOCUMENTS

| 7,400,745 | B2 | 7/2008 | Crabtree |
| 9,125,014 | B2 | 9/2015 | Block et al. |

(Continued)

OTHER PUBLICATIONS

Mell, Peter, et al., "The NIST Definition of Cloud Computing", Special Publication 800-145, Sep. 2011, Gaithersburg, MD, 7 pgs.
(Continued)

*Primary Examiner* — Nimesh Patel
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and systems are presented. The method, computer program products, and systems can include, for instance: obtaining position data for a plurality of mobile devices, wherein mobile devices of the plurality of mobile devices have associated identifiers, and wherein the obtained position data is data that has been derived using wirelessly emitted signals; examining data of the position data to determine that one or more user is present within a neighboring zone of a venue, the neighboring zone being a zone that neighbors a certain zone of the venue; predicting that at least one user of the one or more user within the neighboring zone intends to be in the certain zone; specifying a zone association of the at least one user as the certain zone of the venue; and providing one or more output based on the specifying.

20 Claims, 10 Drawing Sheets

Related U.S. Application Data

No. 15/708,248, filed on Sep. 19, 2017, now Pat. No. 10,123,165.

(51) Int. Cl.
*H04M 1/725* (2006.01)
*H04W 4/029* (2018.01)
*G06N 20/00* (2019.01)

(52) U.S. Cl.
CPC ........ *H04M 1/72572* (2013.01); *H04W 4/023* (2013.01); *H04W 4/029* (2018.02)

(58) Field of Classification Search
CPC .. G05D 1/0022; G05D 1/0214; G05D 1/0278; G05D 1/0257; G05D 1/0287; G05D 1/0246; G05D 1/0248; G05D 2201/0212; G05D 2201/0216; G05D 1/0011; G05D 1/0285; H04L 67/12; H04L 67/10; H04L 43/04; H04L 67/18; H04L 2209/84; H04L 43/16; H04L 45/3065; H04L 47/2441; H04L 63/0853; H04L 67/125; H04L 63/1408; H04L 63/1433; H04L 67/22; H04L 67/306; H04L 67/325; H04W 4/80; H04W 84/12; H04W 4/046; H04W 4/02; H04W 4/021; H04W 4/023; H04W 4/025; H04W 4/029; H04W 36/32; H04W 48/04; H04W 4/04; H04W 4/70; H04W 64/00; H04W 72/048; H04W 88/02; H04W 4/21; H04W 4/33; G06N 20/00; H04M 1/72572; H04M 1/7253; G06Q 30/0613; G06Q 50/01; G06Q 10/02; G06Q 10/06311; G06Q 10/063116; G06Q 10/109; G06Q 30/0201; G06Q 30/0259; G06Q 30/0261; G06Q 30/0272

See application file for complete search history.

(56) References Cited

U.S. PATENT DOCUMENTS

| | | | |
|---|---|---|---|
| 9,167,456 B2* | 10/2015 | Kemppainen | H04L 63/302 |
| 9,674,708 B2* | 6/2017 | Fujiwara | H04W 12/12 |
| 9,877,205 B2* | 1/2018 | Li | H04W 16/18 |
| 10,123,165 B1 | 11/2018 | Graham et al. | |
| 2007/0122002 A1* | 5/2007 | Crabtree | G06K 9/00771 |
| | | | 382/103 |
| 2010/0015993 A1* | 1/2010 | Dingler | G06Q 10/109 |
| | | | 455/456.1 |
| 2013/0007843 A1* | 1/2013 | Cheng | H04W 12/06 |
| | | | 726/3 |
| 2013/0174228 A1 | 7/2013 | Etchegoyen et al. | |
| 2015/0058049 A1 | 2/2015 | Shaw | |
| 2015/0304481 A1* | 10/2015 | Kobylarz | H04W 4/00 |
| | | | 455/418 |
| 2016/0323708 A1 | 11/2016 | Sahadi et al. | |
| 2016/0381545 A1* | 12/2016 | Wang | H04W 12/12 |
| | | | 455/434 |
| 2019/0090086 A1 | 3/2019 | Graham et al. | |

OTHER PUBLICATIONS

List of IBM Patents or Patent Applications to be Treated as Related U.S. Appl. No. 16/571,234, filed Sep. 16, 2019, dated Dec. 27, 2019.

* cited by examiner

ELIMINATING FALSE POSITIVES OF NEIGHBORING ZONES

CROSS-REFERENCE TO RELATED APPLICATION

This application is a continuation of U.S. patent application Ser. No. 16/144,306 filed on Sep. 27, 2018, entitled, "Eliminating False Positives of Neighboring Zones," the entirety of which is hereby incorporated herein by reference and which is a continuation of U.S. patent application Ser. No. 15/708,248, filed Sep. 19, 2017, entitled, "Eliminating False Positives of Neighboring Zones," the entirety of which is hereby incorporated herein by reference.

BACKGROUND

Mobile device positioning systems have been proposed which employ use of IEEE 802.11 ("Wi-Fi") radio transceivers. Wi-Fi positioning systems (WPS) have been proposed where the Global Positioning System (GPS) are inadequate due to various causes including multipath and signal blockage indoors. Wi-Fi positioning takes advantage of the availability of wireless access points.

Proposed positioning techniques employing wireless access points have included techniques based on measuring the intensity of the received signal (received signal strength indication or RSSI). Typical parameters useful to geolocate the Wi-Fi hotspot or wireless access point include an access point's SSID and MAC address. Accuracy can depend on the number of positions that have been collected. A Wi-Fi hotspot database can include data correlating mobile device GPS location data with Wi-Fi hotspot MAC addresses.

Positioning techniques using one way communication short range radio signal beacons have been proposed. According to one technique a short range radio signal beacon can be disposed at a predetermined location. Receipt of the short range radio signal by a mobile device indicates that the mobile device is proximate the predetermined location.

SUMMARY

Shortcomings of the prior art are overcome, and additional advantages are provided, through the provision, in one aspect, of a method. The method can include, for example: obtaining position data for a plurality of mobile devices, wherein mobile devices of the plurality of mobile devices have associated identifiers, and wherein the obtained position data is data that has been derived using wirelessly emitted signals; examining data of the position data to determine that one or more user is present within a neighboring zone of a venue, the neighboring zone being a zone that neighbors a certain zone of the venue; predicting that at least one user of the one or more user within the neighboring zone intends to be in the certain zone; specifying a zone association of the at least one user as the certain zone of the venue; and providing one or more output based on the specifying.

In another aspect, a computer program product can be provided. The computer program product can include a computer readable storage medium readable by one or more processing circuit and storing instructions for execution by one or more processor for performing a method. The method can include, for example: obtaining position data for a plurality of mobile devices, wherein mobile devices of the plurality of mobile devices have associated identifiers, and wherein the obtained position data is data that has been derived using wirelessly emitted signals; examining data of the position data to determine that one or more user is present within a neighboring zone of a venue, the neighboring zone being a zone that neighbors a certain zone of the venue; predicting that at least one user of the one or more user within the neighboring zone intends to be in the certain zone; specifying a zone association of the at least one user as the certain zone of the venue; and providing one or more output based on the specifying.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining position data for a plurality of mobile devices, wherein mobile devices of the plurality of mobile devices have associated identifiers, and wherein the obtained position data is data that has been derived using wirelessly emitted signals; examining data of the position data to determine that one or more user is present within a neighboring zone of a venue, the neighboring zone being a zone that neighbors a certain zone of the venue; predicting that at least one user of the one or more user within the neighboring zone intends to be in the certain zone; specifying a zone association of the at least one user as the certain zone of the venue; and providing one or more output based on the specifying.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
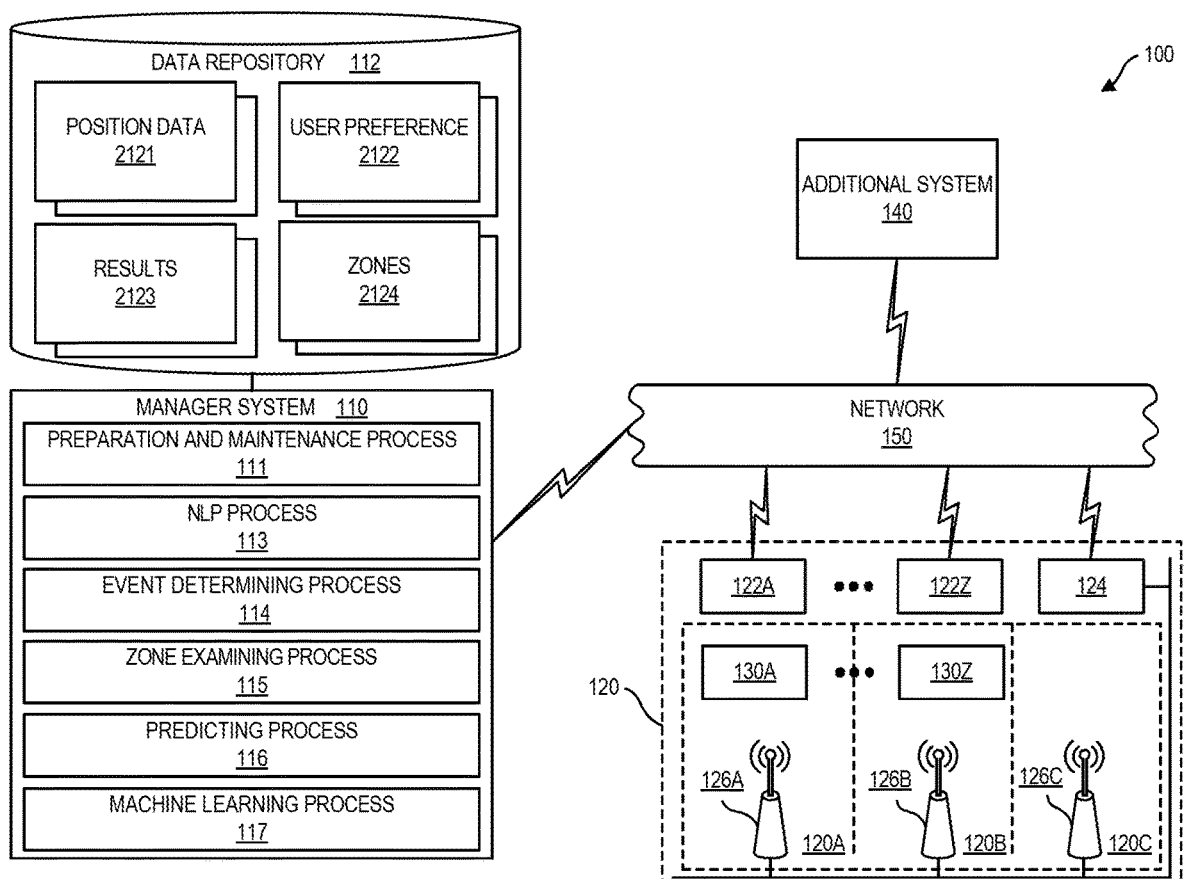
FIG. 1 depicts a system having manager system and computer devices disposed within a venue according to one embodiment.

FIG. 1 is a block diagram of system 100, in accordance with one embodiment as set forth herein. In the embodiment of FIG. 1, system 100 can include numerous devices, such as computer node based devices connected by a network 150. For example, network 150 may be a physical network or a virtual network. A physical network can be, for example, a physical telecommunications network connected to numerous computer nodes or systems, such as may be provided by computer servers and computer clients. By contrast, a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include manager system 110, having an associated data repository 112, access devices 122A-122Z, disposed within a venue 120 defined by a geographical area e.g. which can be defined by a two-dimensional perimeter, and user computer devices 130A-130Z, venue system 124 and one or more additional system 140. Manager system 110, access devices 122A-122Z, beacons 126A, 126B, and 126C, computer devices 130A-130Z, venue system 124, and one or more additional system 140 can be in connection with one another via a network 150.

Regarding one or more user computer device 130A-130Z, a computer device of one or more user computer device 130A-130Z in one embodiment can include a computing node 10 provided by a client computer, e.g. a mobile device, e.g. a smartphone or tablet, a laptop or smartwatch that runs one or more program e.g. including a web browser for browsing web pages. Manager system 110 in one embodiment can be external to each of access devices 122A-122Z, computer devices 130A-130Z, and additional system 140. Manager system 110 in one embodiment can be co-located with one or more of access devices 122A-122Z, computer devices 130A-130Z, and/or one or more additional system 140.

Venue 120 can include a plurality of zones 120A, 120B, and 120C. Computer devices 130A-130Z can be mobile computer devices carried by respective users between the various zones, 120A, 120B, and 120C of venue 120. Zones 120A, 120B, and 120C can be provided by different spatial areas of venue 120. Beacons 126A, 126B, and 126C which can be in communication with venue system 124 and with manager system 110 via venue system 124 can be disposed, respectively, in zones 120A, 120B, and 120C. System 100 can also include one or more additional system 140, e.g. for providing data regarding items within venue 120 and for a variety of other purposes. Manager system 110 can run various processes, such as, preparation and maintenance process 111, natural language processing (NLP) process 113, event determining process 114, zone examining process 115, predicting process 116, and machine learning process 117. Computer devices can be provided e.g. by any combination of smartphones, smartwatches, tablets, and/or laptop computers.

Data stored in data repository 112 by running of preparation and maintenance process 111 can include various data. For example, in position data area 2121 data repository 112 can store data specifying respective locations of a plurality of users within venue 120. In position data area 2121, there can be stored obtaining position data for a plurality of points in time so that position data area 2121 defines a history of users within venue 120 over time. By examining position data area 2121 over time, manager system 110 in one embodiment for example, can determine a flow of users through various areas of venue 120 as will be set forth herein.

In user preference area 2122, data repository 112 can store data on user preferences of various users of system 100. In one embodiment, each user of system 100 can have an associated computer device, e.g. computer device 130A-130Z. Position data area 2121 can store data on the location of users in venue 120 currently and historically based on an activation of locating services to locate computer devices 130A-130Z, used by various users of system 100. User preference area 2122 of data repository 112, can store data on the preferences of various users of system 100 collected historically, e.g. obtained through locations of venue 120 visited by respective users, purchases made by respective users, and survey information returned by respective users.

In results area 2123, data repository 112 can store data of respective results of various predictions performed by manager system 110. Using data of results area 2123, manager system 110 can adjust predictions provided by manager system 110.

In zones area 2124, data repository 112 can store data respecting spatial location of various zones 120A, 120B, and 120C of venue 120. In general, in one embodiment an administrator user using a user interface displayed on a computer device, e.g. a computer device 130A-130Z used by an administrator user can define zones within a venue that, in one embodiment can include different topic classifications, e.g. in the case of a retail store venue can relate, for example, to a deli section, a bakery section, and a produce section, and/or many other different types of sections dependent upon the type of venue. The various zones can be defined by borders that specify a perimeter of the various zones using spatial information such as coordinate information.

Manager system 110 can run NLP process 113 to process data for preparation of records that are stored in data repository 112 and for other purposes. Manager system 110 can run a Natural Language Processing (NLP) process 113 for determining one or more NLP output parameter of a message. Manager system 110 can tag a processed message with a metadata provided by one or more NLP output parameter. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 system 100 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameter can include topic segmentation to identify several topics within a message. Topic analysis can apply a variety of technologies e.g. clustering one or more of hidden mark model (HMM), artificial chains, and passage similarities using word co-occurrence or topic modeling.

Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Performing sentiment analyses can include use of knowledge-based techniques, statistical methods, and/or hybrid approaches.

Manager system 110 can run event determining process 114 for examining position data of position data area 2121 of data repository 112 over time. Manager system 110 can run event determining process 114 for examining position data to determine a presence of first users remaining in a first predetermined zone of a venue and second users remaining in a second predetermined zone of a venue, and potentially up to N predetermined zones of a venue such as venue 120 (FIG. 1). Using obtained position data obtained from various computer devices, 130A-130Z in venue 120, manager system 110, and running event determining process 114 can determine the count of computer devices 130A-130Z, and therefore the count of users at any given point in time and the locations of the computer devices 130A-130Z in their respective predetermined zones e.g. zone 120A, 120B, and/or 120C.

Running event determining process 114, manager system 110 at any time can examine a history of position data of position data area 2121 e.g. to determine a flow of users throughout a venue 120 over time and/or to determine if a certain computer device e.g. computer device 130A, has remained within its current zone for a predetermined time e.g. a time exceeding a threshold. Manager system 110 can run event determining process 114 to e.g. for determining that a group dwell event has occurred, that a user dwell event has occurred, that a user has entered a specific zone, and/or that a user has exited a specific zone.

In one aspect, manager system 110 running event determining process 114 can determine that a zone has become an "active zone" by the count of computer devices 130A-130Z and therefore users in the zone has exceeded a threshold. Manager system 110 running event determining process 114 can determine that a zone dwell event has occurred when a threshold exceeding number of computer devices 130A-130Z and therefore associated users of such computer devices have remained in a certain zone for more than a threshold period of time. Manager system 110 running event determining process 114 can perform the noted "active zone" determining process for more than one zone e.g. for each zone of venue 120. An "active zone" determining process can include manager system 110 determining that a zone has become crowded based on one or more criterion.

Manager system 110 running event determining process 114 can determine that a user dwell event has occurred based on a certain computer device e.g. computer device 130A remaining in a specific zone for more than a threshold amount of time.

Manager system 110 running zone examining process 115 in one embodiment can determine a count of users currently within one or more specific zone of venue 120, e.g. zone 120A, zone 120B, and/or zone 120C. Manager system 110 running zone examining process 115 can determine a count of users currently within one or more specific zone of venue, 120, e.g. zone 120A, zone 120B, and/or zone 120C. Manager system 110 running zone examining process 115 in one embodiment can identify one or more neighboring zone of a certain zone, e.g. a zone of interest. In one embodiment, manager system can determine that a certain zone is a zone of interest based on crowding of the zone. For determining that a zone has become crowded manager system 110 can apply one or more crowding determination criterion. For identifying one or more neighboring zone of a certain zone, manager system 110 can apply one or more neighboring zone determining criterion.

Manager system 110 running event determining process 114 and zone examining process 115 can use position data that specifies the position, e.g. coordinate position and/or zone position of each computer device 130A-130Z within venue 120. The position data can be provided by any device locating service. A locating service e g running on manager system 110 can perform recording using emitted radio signals obtaining position data for a plurality of computer devices over time e.g. provided by mobile devices, wherein computer devices of the plurality of computer devices have associated identifiers.

In one embodiment, locating services can be provided by implementation of locating services that use radio signal emissions of mobile devices within an IEEE 802.11 network. For example, access devices 122A-122Z can be provided by connection nodes, e.g. 802.11 access points.

In one embodiment, manager system 110 can incorporate locating services available from the locating services systems integrator. According to one example, locating services can be provided by Global Technology Services® of International Business Machines Corporation (IBM) based on the IBM PRESENCE INSIGHTS™ locating services platform. In one embodiment, computer devices 130A-130Z can be carried about venue 120 by the respective users. While being carried about venue 120, computer devices 130A-130Z within venue 120 can be emitting radio signals that are received by access devices 122A-122Z, which access devices 122A-122Z can be provided by IEEE 802.11 access points that communicate with user computer devices 130A-130Z via the IEEE 802.11 radio communication protocol. Access devices 122A-122Z can receive emitted radio signals received from computer devices 130A-130Z and can forward such received radio signals e.g. including digital and/or data representations of such signals to manager system 110 for processing.

In one embodiment, manager system 110 can incorporate beacon based locating services using beacon radio signals emitted by beacons, e.g. beacon based locations services employing short range radio communications, e.g. in accordance with the BLUETOOOTH radio communication protocol. In one embodiment system 100 can include beacons 126A, 126B, 126C disposed in respective zones 120A, 120B, and 120C of venue 120. Each beacon 126A, 126B, 126C can incorporate a short range radio transceiver, e.g. BLUETOOTH transceiver and can emit beaconing signals. Beaconing signals can be received by respective computer devices 130A-130C which can incorporate respective short range radio transceivers, e.g. BLUETOOTH transceivers. With radio signals emitted by beacons 126A, 126B, 126C being short range reception of a beacon signal by a specific computer device from a beacon with a specific zone can indicate that the beacon device is within the specific zone.

Manager system 110 processing radio signals emitted from computer devices 130A-130Z and/or with use of radio signals emitted from beacons 126A, 126B, 126C can determine position data for each computer device 130A-130Z within venue 120 at a current time, and can determine a count of users and user computer devices 130A-130Z within each zone 120A, 120B, 120C at a current time. Manager system 110 can iteratively perform determination of position data and can store history of position data in position data area 2121 of data repository 112.

Processing by manager system 110 to determine the position of a mobile device can include e.g. signal strength (RSSI based processing, fingerprint based processing, angle of arrival processing, triangulation based processing, and time of flight based processing), or beacon signal processing. On receiving signals from a computer device 130A-130Z, manager system 110 can record a position for a computer device 130A over time. On receiving signals from a computer device e.g. computer device 130A, manager system 110 can associate received signals with an identifier for the computer device e.g. computer device 130A e.g. a medium access control address (MAC address) of computer device 130A. Accordingly, for position data including recorded path data, manager system 110 can record an associated MAC address associated to the position data. Recording of position data can include storing of position data into data repository 112 in position data area 2121.

In one embodiment, an identifier for a computer device 130A-130Z, e.g. a MAC address can be regarded to be an identifier for a user of the computer device. In one embodiment, manager system 110 can store in data repository 112 a user ID for each user of system 100. In some embodiments, there can be stored in data repository 112 more than one identifier for a computer device 130A-130Z. For example, a specific user computer device 130A can include an IEEE 802.11 MAC address associated to an IEEE 802.11 radio transceiver of the computer device and a Bluetooth MAC address associated to a Bluetooth radio transceiver of the computer device. Each user ID can be associated to one or more computer device. User identifiers, e.g. provided by user IDs and/or computer device identifiers can be associated to user preference data stored in user preference area 2122 of data repository 112.

Manager system 110 can run predicting process 116 to predict that a user presently located within a neighboring zone e.g. zone 120A that neighbors a certain zone e.g. zone 120B, actually intends to be within the certain zone e.g. zone 120B of a venue 120. Manager system 110 running predicting process 116 can perform such prediction using in one embodiment, the formula set forth in Eq. 1.

$$S = F_1 W_1 + F_2 W_2 + F_3 W_3 + F_4 W_4 \qquad \text{(Eq. 1)}$$

Where S is a scoring function, where $F_1$ is a first factor, $F_2$ is a second factor, $F_3$ is a third factor, $F_4$ is a fourth factor, and wherein $W_1$-$W_4$ are weights associated with the first through fourth factors. In one embodiment, factor $F_1$ can be a location factor e.g. based on a proximity of a user to a neighboring zone, factor $F_2$ can be a flow factor independence on a flow of users between zones over time, factor $F_3$ can be a formation factor independence on a spatial formation defined by a group of users, and factor $F_4$ can be a user preference factor.

Manager system 110 running machine learning process 117, in one embodiment can update predicting process 116 based on results that are produced using predicting process 116. For example, if a result indicates that a prior prediction was correct with predicting process used can be biased in favor of the particular process producing the correct prediction. If results data indicates that the prior prediction was incorrect, the predicting process used can be biased against the process using the incorrect prediction. In one embodiment, the respective weights $W_1$-$W_4$ can be varied within valid ranges. Manager system 110 can adjust respective weights $W_1$-$W_4$ over time based results data of results area 2123 so that the respective weights $W_1$-$W_4$ are based in favor of weights producing accurate predictions.

Figure 2:
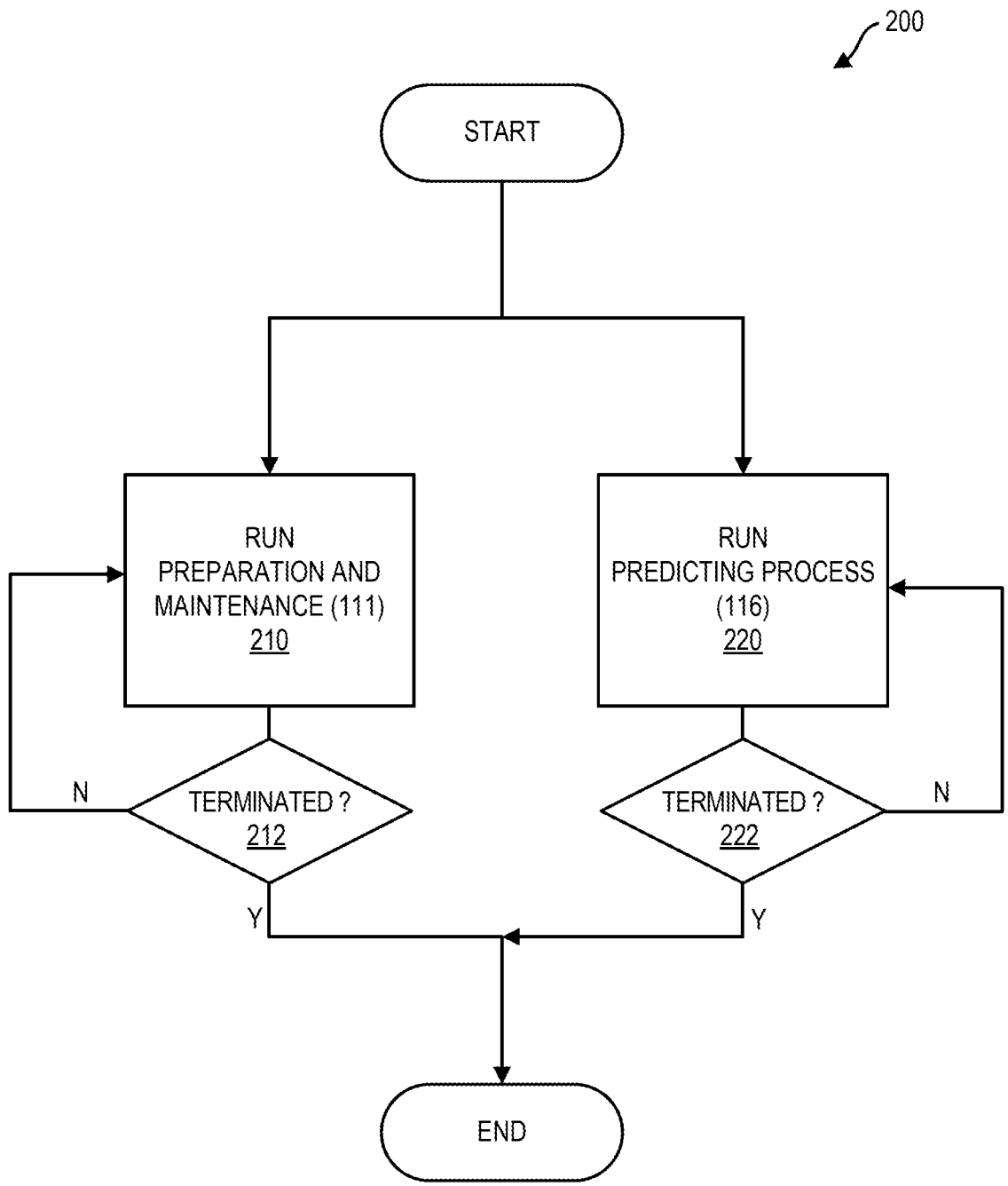
FIG. 2 is a flowchart depicting a data preparation and maintenance method for performance by a manager system according to one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data of position data area 2121, user preference area 2122, results area 2123 and zones area 2124. Manager system 110 can run preparation and maintenance process 111 until process 111 is terminated at block 212. At block 220, manager system 110 can run predicting process 116 to predict that a user within a neighboring zone neighboring a certain zone intends to be in the certain zone. Manager system 110 can run predicting process 116 until predicting process 116 is terminated at block 222. For running of predicting process 116, zone examining process 115 and other processes can be iteratively run.

For performance of preparation and maintenance process 111, manager system 110 can be configured to automatically process data received by components of system 100 including access devices 122A-122Z, venue system 124, computer devices 130A-130Z, and additional system 140. Manager system 110 can run Natural Language Processing (NLP) processes for the performing of preparation and maintenance process 111.

Figure 3:
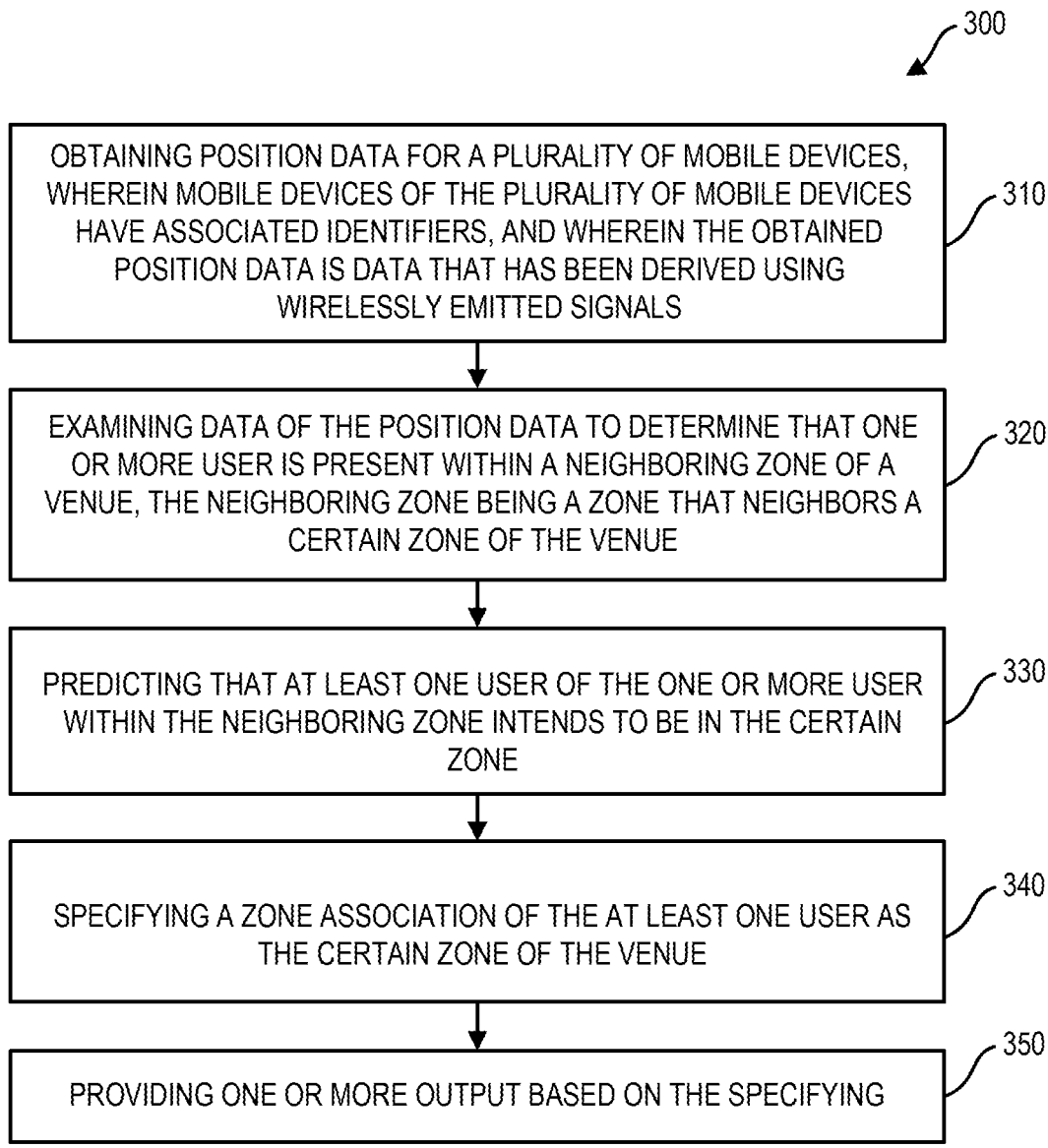
FIG. 3 is a flowchart depicting a data preparation and maintenance method for performance by a manager system according to one embodiment.

A method 300 for performance by manager system 110 in one embodiment is further described in reference to the flowchart of FIG. 3. At block 310, manager system 110 can perform obtaining position data for a plurality of mobile devices, wherein mobile devices of the plurality of mobile devices have associated identifiers, and wherein the obtained position data is data that has been derived using wirelessly emitted signals. At block 320, manager system 110 can perform examining data of the position data to determine that one or more user is present within a neighboring zone of a venue, the neighboring zone being a zone that neighbors a certain zone of the venue. At block 330, manager system 110 can perform predicting that at least one user of the one or more user within the neighboring zone intends to be in the certain zone. At block 340, manager system 110 can perform specifying a zone association of the at least one user as the certain zone of the venue. At block 350 manager system 110 can perform providing one or more output based on the specifying.

Figure 4:
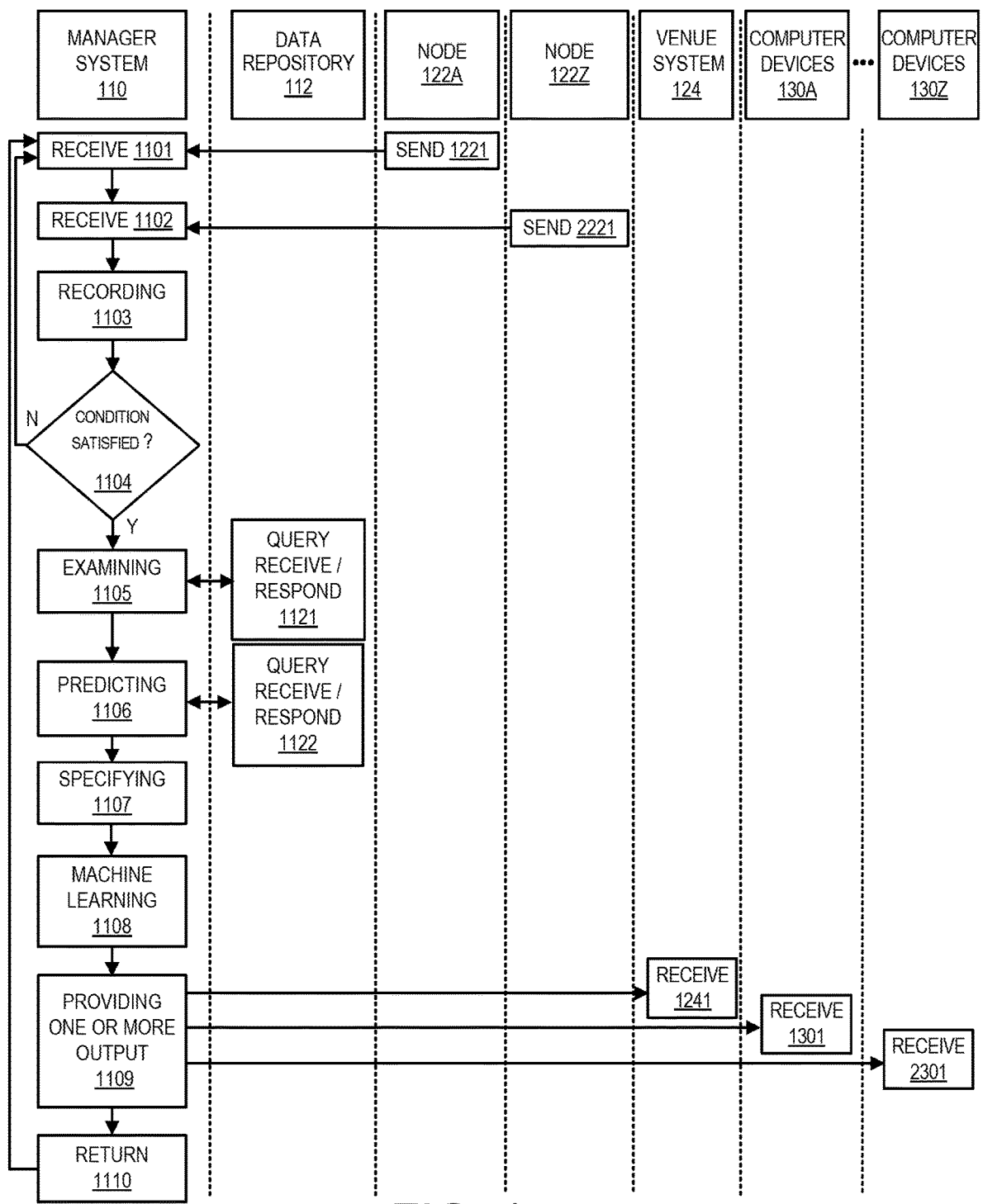
FIG. 4 is a flowchart illustrating performance of a method by a system according to one embodiment.

Referring now to the flowchart of FIG. 4, a specific embodiment of method 300 as shown in the flowchart of FIG. 3 is described. The flowchart of FIG. 4 presents processing functionality from the perspective of manager system 110 and its associated data repository 112, access devices 122A-122Z in venue 120. At blocks 1221 and 2221, access devices 122A-122Z respectively, can send radio signal data for receipt and processing by manager system 110 at blocks 1101 and 1102 respectively. The radio signal data can be radio signal data based on radio signals received by access devices 122A-122Z from computer devices 130A-130Z that are being carried about venue 120 by users. Based on the radio signal data sent at blocks 1221 and 2221 for receipt by manager system 110 manager system 110 can perform processing of received radio signal data received at block 1101 and 1102 for determining and obtaining position data indicating a current position of each of a plurality of computer devices 130A-130Z within venue 120. In one embodiment, venue system 124 can process received radio signals received by access devices 122A-122Z and can send determined position data to manager system 110 which can obtain the position data by receiving the position data.

Alternative to or in addition to access devices 122A-122Z sending radio signal data for receipt and processing by manager system 110 at blocks 1101 and 1102 respectively for position determining, user computer devices 130A-130Z can be sending for receipt and processing by manager system 110 beacon position data indicating a beacon identifier of a beacon 126A, 126B, 126C sending beacon signals for receipt by user computer devices 130A-130Z. Beacon signal data received by manager system 110 from computer device 130A-130Z can indicate a current zone position of each user computer device 130A-130Z and therefore each user within venue 120. Beacon signal data received by manager system 110 from computer device 130A-130Z can include e.g. a beacon identifier indicating a specific beacon and therefore a specific zone from which the beacon signal was emitted and/or signal strength data indicating a signal strength of a received beacon signal received by a computer device 130A-130Z. Manager system 110 and/or venue system 124 in some embodiments can determine coordinate positions based on radio beacon signal data, e.g. using received signal strength (RSSI) triangulation and/or time of fight methods. In accordance with the foregoing description manager system 110 can obtain position data that has been derived using emitted wireless signals provided by emitted radio signals. In another embodiment, manager system 110 can obtain position data that has been derived using emitted wireless signals provided by emitted ultrasound signals.

Manager system 110 at recoding block 1103 can obtain position data and can perform recording in position data area 2121 position data, e.g. coordinate position and/or zone position. Embodiment herein recognize that with recording block 1103 being performed iteratively over time position data area 2121 of data repository 112 can store position data over time that can be processed to determine a history of flow of users within venue 120 over time. Manager system 110 can perform analytics using data stored in data repository 112, including analytics performed by event determining process 114 as set forth herein.

At block 1104, manager system 110 can perform determining that a triggering condition is present. Block 1104 can be regarded to be a condition evaluation block. A triggering condition herein can be regarded as a condition to initiate a process to determine that a user intends to be in a zone other that a zone currently occupied by the user. Embodiments herein recognize that with certain one or more criterion satisfied, there is an increased likelihood of users of system 100 intending to be in locations within venue other than their current location. Embodiments herein recognize that overcrowding of a certain venue zone can result in an increased likelihood that users in neighboring zones neighboring the certain zone intend to be in a zone other than the zone they are in, namely the certain zone. For example, where a certain zone becomes overcrowded, a user waiting line can form to prevent users from entering the certain zone. Determining that a triggering condition is present can include determining that a certain zone has become crowded. At block 1104 determining that a triggering condition is present can include determining that a certain zone has become crowded by determining that a zone currently includes more than a threshold number of users and has accordingly become an active zone. At block 1104 determining that a triggering condition is present can include determining that a certain zone has become crowded by determining that a zone has included more than a threshold number of users for more than a threshold period of time and has accordingly become an active zone. Manager system 110 at block 1104 can run event determining process 114.

Figure 5:
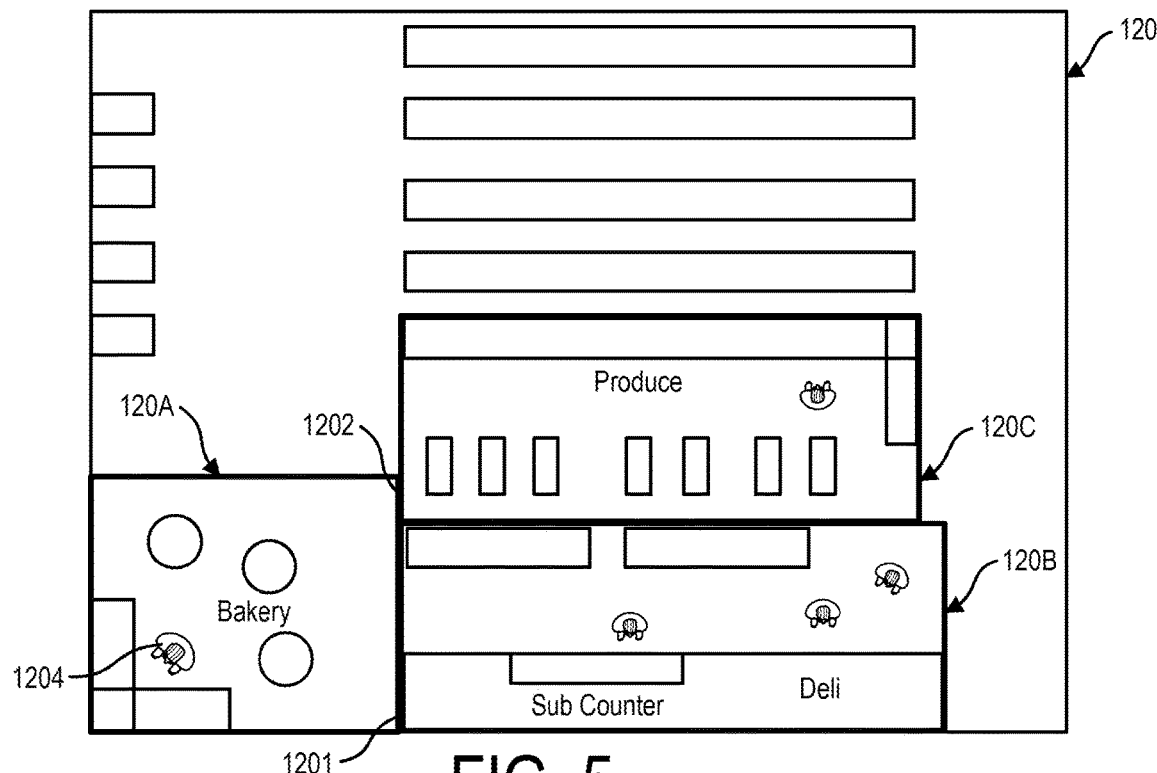
FIG. 5 is a depiction of a venue according to one embodiment.
Figure 6:
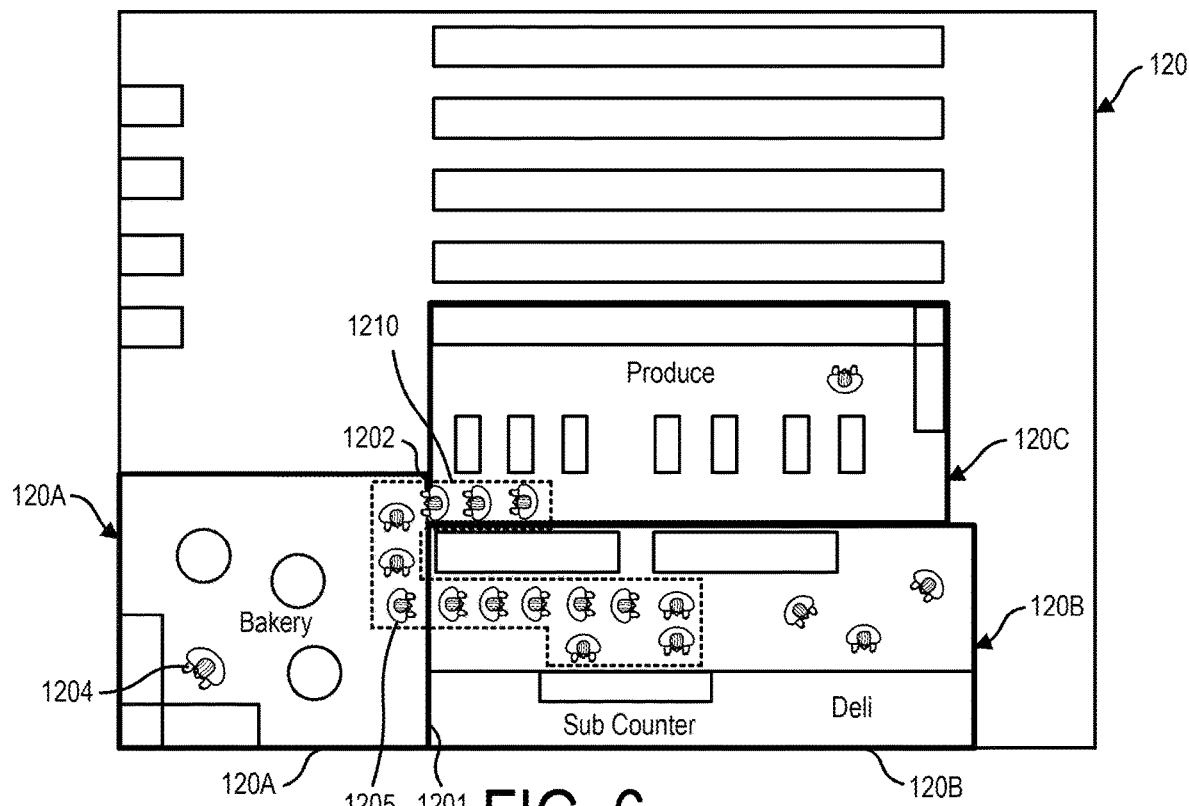
FIG. 6 is a depiction of a venue according to one embodiment.

At block 1104, manager system 110 can count the number of users (each carrying a computer device) in each of the respective zones. For example, with the position data of various users as shown in the state of FIG. 5, performance of condition evaluation block 1104 can produce the count of users as follows: one user in zone 120A, three users in zone 120B, and one user in zone 120C. With position data shown in the state as depicted in FIG. 6, condition evaluation at block 1104 can produce the result as follows: four users present in zone 120A, eleven users in zone 120B, and four users in zone 120C. Condition evaluation at block 1104 can include examining to determine whether a number of users exceeds a threshold in each zone. For example, whether the number of users presently included in zone 120A exceeds a threshold, whether the number of users in zone 120B exceeds a threshold, and/or whether a number of users in zone 120C exceeds a threshold.

At block 1105, manager system 110 can perform zone examining e.g. by activation of zone examining process 115 (FIG. 1). Examining at block 1105 can include examining data of the position data to determine that one or more user is present within a neighboring zone of a venue, the neighboring zone being a zone that neighbors a certain zone of the venue. In one embodiment, the certain zone can be zone of interest, such as a zone determined to be crowded as set forth in connection with block 1104. In one embodiment, neighboring zones of certain zone can include all zones spatially adjacent to the certain zone. In one embodiment, neighboring zones of certain zone can include all zones spatially adjacent to a zone that is spatially adjacent a certain zone. In one embodiment, neighboring zones of a certain zone can include all zones spatially adjacent to a zone that is within a threshold distance of the certain zone.

In one embodiment, manager system 110 based a certain zone being determined to be crowded at block 1104 can determine by performance of block 1103 one or more neighboring zone of the certain zone. Examining at block 1104 can include manager system 110 identifying one or more neighboring zone of the certain zone applying one or more criterion, e.g. based on the criterion that a zone is adjacent, based on the criterion that the neighboring zone is adjacent to a zone adjacent to the certain zone, and/or based on the criterion that the neighboring zone is within a threshold distance.

Embodiments herein recognize that users within a certain zone of a venue may intend to actually be in another zone of the venue. Embodiments herein recognize that a failure to account for such users who intend to be elsewhere in a venue can result in skewed data and the providing of outputs that are not accurately aligned to the interests or qualifications of users. Examining at block 1105 can include multiple queries for data of data repository 112 and return data from data repository 112 as is indicated by query receive and a respond block 1121 performed by data repository 112. Performance of block 1104 can include multiple queries of data of data repository 112 and return data from data repository 112.

At block 1106, manager system 110 can perform predicting that one or more user located in a neighboring zone of a venue 120 intends to be in another zone of a venue 120, e.g. a certain zone, which can be a zone of interest such as a crowded zone. Predicting at block 1106 can include multiple queries of data repository 112 and return data from data repository 112 as is indicated by query receive and respond block 1122. Performing predicting at block 1106 by manager system 110 can include manager system 110 activating predicting process 116 as set forth in reference to FIG. 1. Performing predicting at block 1104 can include use of Eq. 1 as set forth hereinabove, wherein a function can be applied by manager system 110 that includes multiple factors e.g. factor $F_1$ a location factor, factor $F_2$ a flow factor, factor $F_3$ a formation factor, and factor $F_4$ a user preference factor.

Manager system 110 can determine a probability of a user intending to be in certain zone independently based on a variety of factors $F_1$-$F_4$ and can weight and sum the factors to provide an overall prediction specified by the value "S" of Eq. 1. Manager system 110 can determine that a user within a neighboring zone intends to be in a certain zone based on the prediction score "S" being above a threshold, e.g. a predetermined or dynamically determined threshold.

Regarding factor $F_1$ in further detail, factor $F_1$ can be a location factor. Manager system 110 can perform a prediction of the user's intent to be in another zone using a current location of the user. Factor $F_1$ can be a proximity factor that is based on the proximity of the user to a neighboring zone. Using factor $F_1$ and in reference to FIGS. 5 and 6, a user's intent to be in another zone can be based in part on a proximity of the user to another zone. Referring to FIGS. 5 and 6, border 1201 depicts a border between zone 120A and zone 120B and border 1202 depicts a border between zone 120A and zone 120C. Referring to FIG. 6, user 1204 is depicted as being a farther distance away from border 1201 delimiting zone 120B, than is user 1205 who is located a close distance from border 1201 delimiting zone 120B. Accordingly, manager system 110 can apply to user 1205 a higher scoring factor value under factor $F_1$, than is user 1204 who is located a greater distance away from zone 120B delimited by border 1201.

Regarding factor $F_2$, factor $F_2$ can be a flow factor. A flow factor can be in dependence on a flow of users over time between zones. In determining and predicting a likelihood of a user in zone 120A intending to be in zone 120B, manager system 110 using factor $F_2$ a flow factor, can analyze a flow of all users between zones 120A and 120B during a proceeding time period. If many users are observed over time transitioning from zone 120A to 120B manager system 110 can apply a higher scoring factor value according to flow factor $F_2$. Where manager system 110 observes little or no flow activity between zone 120A and 120B manager system 110 can apply a lower scoring factor value according to a flow factor $F_2$.

Manager system 110 at block 1106 using Eq. 1, can apply a formation factor $F_3$. For application of formation factor $F_3$ manager system 110 can analyze a spatial area defined by a group of users. Referring to FIG. 6, manager system 110 using position data can identify a group of users and can specify perimeter 1210 containing a group of users. Manager system 110 can then perform pattern matching using stored signature patters of data repository 112 to identify a pattern defined by perimeter 1210. Manager system 110 can specify the likelihood of the perimeter 1210 defining a linear pattern and can use such function as a scoring factor under formation factor $F_3$. Thus, in one embodiment, according to formation factor $F_3$ manager system 110 can score the likelihood of a formed pattern defined by a group of users as defining a line pattern indicative of a line of users waiting in line between zones. Manager system 110 can apply a higher scoring factor value under factor $F_3$ to a user forming a spatial pattern with other users having a low dissimilarity score (e.g. below a threshold) relative to line signature pattern according to factor $F_3$ and can apply a lower scoring factor value according to factor $F_4$ to a user who forms with other users a spatial pattern with a high dissimilarity score (e.g. above a threshold relative to a line signature pattern.

According to factor $F_4$ manager system 110 can analyze a subject matter preference of a specific user e.g. user 1205. Preference data can be e.g. past venue positions of a user, past purchases of a user, and/or past survey data returned by a user. In some embodiments data repository 112 in position area 2121, can associate MAC addresses to position data to MAC addresses serving as identifiers of computer devices 130A-130Z. In some embodiments, data repository 112 in user preference area 2122 can associate user IDs to user preference data in addition to position data, e.g. purchase data and survey data. Based on such history data, according to factor $F_4$ manager system 110 can score the users intent to be in a certain zone, e.g. first zone or a second zone (e.g. zone 120A or zone 120B).

Manager system 110 for example, can activate NLP process 113 to perform topic analysis using NLP topic processing to determine whether historical preferences of the user are aligned to a zone other than a zone which the user is currently in. Manager system 110 can apply a higher scoring factor value under factor $F_4$ to a user having interests aligned with deli items under scoring factor $F_4$ and can apply a lower scoring factor value according to factor $F_4$ than to a user who has interests e.g. determined by topic analysis not aligned with deli items. Based on a scoring function, "S", using Eq. 1 exceeding a threshold, manager system 110 at predicting block 1106 can determine that a user e.g. user 1205 currently located in zone 120A intends to be in zone 120B.

Manager system at block 1107 can perform specifying a location of the user based on the predicting performed at block 1106. Based on a predicting at block 1106 that a user located in a neighboring zone e.g. zone 120A intends to be in a certain zone e.g. zone 120B manager system 110 at block 1107 can specify that the user is in the certain zone. Alternatively or additionally based on a predicting at block 1106 that a user located in a neighboring zone e.g. zone 120A intends to be in a certain zone, manager system 110 at block 1107 can refrain from specifying that the user is in the neighboring zone.

Figure 7:
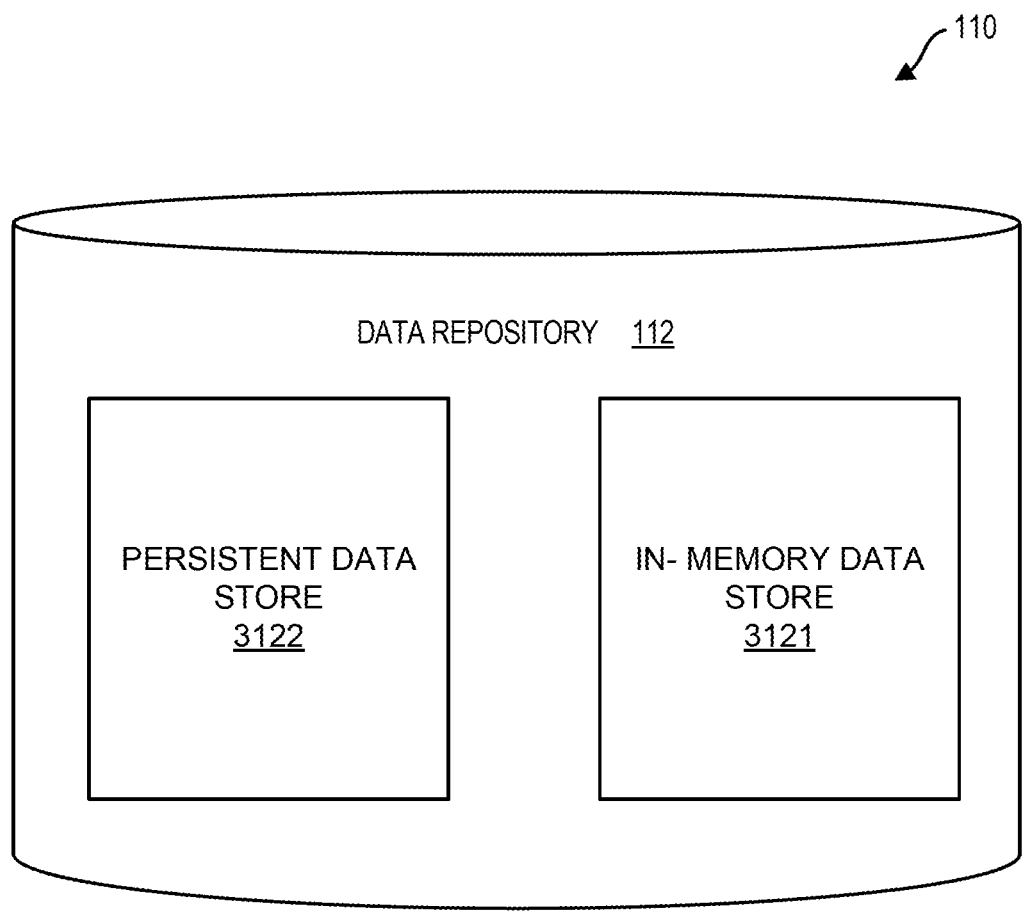
FIG. 7 is hardware schematic diagram of a data repository according to one embodiment.

Various aspects of data repository 112 are described with reference to FIG. 1. Exemplary logical divisions of data within data repository 112 are set forth in reference to FIG. 1. Exemplary hardware divisions of memory system computer readable media defining data repository 112 are set forth herein in reference to FIG. 7. In one embodiment as illustrated in the hardware schematic diagram of FIG. 7 data repository 112 can include an in-memory data store 3121 and a persistent data store 3122. Data the different logical data repository components of data repository 112 can be distributed between in-memory data store 3121 and persistent data store 3122. For example, position data area 2121 of data repository 112 can be partially distributed in in-memory data store 3121 and partially distributed in persistent data store 3122.

In-memory data store 3121 in one embodiment can be provided by an in-memory database. In-memory data store 3121 in one embodiment can be non-persistent. In-memory data store 3121 can include main memory readable media such as Random Access Memory (RAM) and/or cache memory. Persistent data store 3122 can include disk storage or other persistent storage readable media. Assessing data from in-memory data store 3121 can be faster (e.g. Nx faster where N>=3) than accessing data from persistent data store 3122.

In one embodiment, in-memory data store 3121 can include a REDIS in-memory data store which is a networked open source (BSD licensed) in-memory data structure store used as a database, cache and message broker. In-memory data store 3121 can support a variety of abstract structures such as strings, lists, maps, sets, sorted sets, hyperlogs bitmaps and spatial indexes. In one embodiment, persistent data store 3122 can include a disk stored persistent relational database e.g. Structured Query Language (SQL) or non-relational database, e.g. a NoSQL database.

Embodiments herein recognize that data produced by system 100 can be voluminous. For example there can be thousands of users per day in each venue 120 each reporting thousands of different positions while being moved about a venue and manager system 110 in one embodiment can track data from multiple (e.g. hundreds or thousands of venues). Data repository 112 can include persistent data store 3122 to provide a historical record of venue traffic. In one embodiment, each of in-memory data store 3121 and persistent data store 3122 of data repository 112 can be implemented in different storage area networks (SANs).

Embodiments herein can include data filtering processes so that only data of qualified accuracy is stored in persistent data store 3122. For example, as set forth herein embodiments herein recognize that users of system 100 may intend to be at location of a venue 120 other than their actual location. Embodiments herein can feature storing a location of user in persistent data store 3122 according the user's intended location. Accordingly, data repository 112 can accurately store in a persistent memory store accurate reading of users' intended locations.

The described memory system architecture featuring filtering of data stored into persistent data store 3122 improves the performance of system 100 including by increasing software reliability, efficiency, security, maintainability, reducing storage size and increasing speed of access of persistent data store 3122. According to embodiments herein, manager system 110 can perform processing of position data while position data is recorded in in-memory data store 3121 and prior storage of position data into persistent data store 3122 to determine that a user intends to be located other than a current location. Accordingly, the determination of intended location can occur with greater speed and accuracy and without exposure of persistent data store 3122 to additional interfaces or data queries, potentially deleterious to data security and inhibiting of access for a baseline set of data analytics processes e.g. the analytics processes of event determining process 114. Embodiment herein address needs for long term data logging, without compromise of speed, software reliability, security or maintenance.

In one embodiment, persistent data store 3122 according to the described memory system architecture can remain optimized for facilitation of data analytics processes performed by manager system 110 such as data analytics processes of event determination process 114 to determine one or more event based on an analysis of position over time. Manager system 110 running event determining process 114 can determine such events as a group dwell event, a user dwell event, a user zone entry event, or a user zone exit event.

Referring to the flowchart of FIG. 4 obtaining position data by manager system 110 at block 1103 can include manager system 110 storing position data in in-memory data store 3121 to facilitate fast access of such data. Manager system 110 for access of position data for performance block 1104 (to determine that a trigger condition is satisfied) block 1105 (examining) and block 1106 (predicting) can include access of position data from in-memory data store 3121 to accelerate determination according to blocks 1104, 1105, and 1106 while multiple users are changing position within venue 120.

In one embodiment manager system 110 performing specifying block 1107 can include manager system 1110 storing position data into persistent data store 3122. For example, manager system 110 performing specifying block 1107 can include manager system 110 storing into persistent data store 3122 data specifying a zone association of a user in accordance with a determined intended location of the user where the user is currently actually at a location other that the intended location. Accordingly, persistent data store 3122 can include user positions in accordance with intended positions of users. Analytics for determining events with respect to a specific user, e.g. to determine group dwell events involving the specific user, a user dwell event with respect to the specific user, zone entry events and zone exit events, can be performed with greater accuracy, and without an increase in data queries of persistent data store 3122. As noted based on a predicting at block 1106 that a user located in a neighboring zone e.g. zone 120A intends to be in a certain zone e.g. zone 120B manager system 110 at block 1107 can specify that the user is in the certain zone. Alternatively or additionally based on a predicting at block 1106 that a user located in a neighboring zone e.g. zone 120A intends to be in a certain zone, manager system 110 at block 1107 can refrain from specifying that the user is in the neighboring zone. The refraining from specifying at block 1107 can include refraining from storing position information into persistent data store 3122 indicating that the user is in the neighboring zone. Thus, system 100 can avoid costly processing of "false positive" data, and can avoid event determinations based on a user being at a location other than an intended location of the user.

In one embodiment functions described herein in reference to manager system 110 can be implemented with use of a microservices architecture. An exemplary microservices architecture is set forth in reference to FIG. 8. In one embodiment, manager system 110 can include a plurality of microservices, e.g. $\mu s_1$, $\mu s_2$, $\mu s_{N-1}$, and $\mu s_N$ The various microservices, $\mu s_1$, $\mu s_2$, $\mu s_{N-1}$, and $\mu s_N$ in one embodiment can be performed using one or more computer system disposed within a data center remote from venue 120 having venue system 124.

In one embodiment, non-persistent data store 3121 as set forth herein can include message queue 4121. The various microservices, $\mu s_1$-$\mu s_N$, can be configured to perform isolated functions. The architecture described as set forth in reference to FIG. 8 facilitates system modularity. Data processing functions can be implemented with use of new microservices without disruption of existing services. Each microservice, $\mu s_1$-$\mu s_N$, can poll message queue 4121 for messages tagged with topics subscribed to by the microservice and based on identification of a message associated with its function can access the payload data of the message, process it, and return it to message queue 4121 with a new topic tag indicating operation by another microservice in communication with message queue 4121.

In the specific embodiment described with reference to FIG. 8, microservices $\mu s_1$ and $\mu s_2$ can be configured to perform position data transformation functions. For example, microservice $\mu s_1$ can poll message queue 4121 for messages tagged for operation by microservice $\mu s_1$. $\mu s_1$, can for example transform position message data received from a data source within venue 120 and transform the position data into another format. For example, microservice $\mu s_1$ can transform position data received in the format ([device ID], [coordinate location]) into the transformed format of: ([device ID],[zone ID]). On transformation of the position data, microservice $\mu s_1$ can send the transformed position data back to message queue 4121 retagged to indicate that another microservice in operation should operate on the payload of the retagged message.

Microservice $\mu s_2$ can be configured to operate on messages having beacon based position data. Microservice $\mu s_2$ can poll message queue 4121 for messages indicating operation by microservice $\mu s_2$. In one embodiment, microservice $\mu s_2$ can transform position data received from a source within venue 120 having the format: ([user ID],[beacon ID]) and can transform such position data into the output format of: ([user ID],[zone ID]). With the position data transformed, microservice $\mu s_2$ can send transformed position data back to message queue 4121, retagged to indicate that the payload of the retagged message should be operated on by another microservice.

Figure 8:
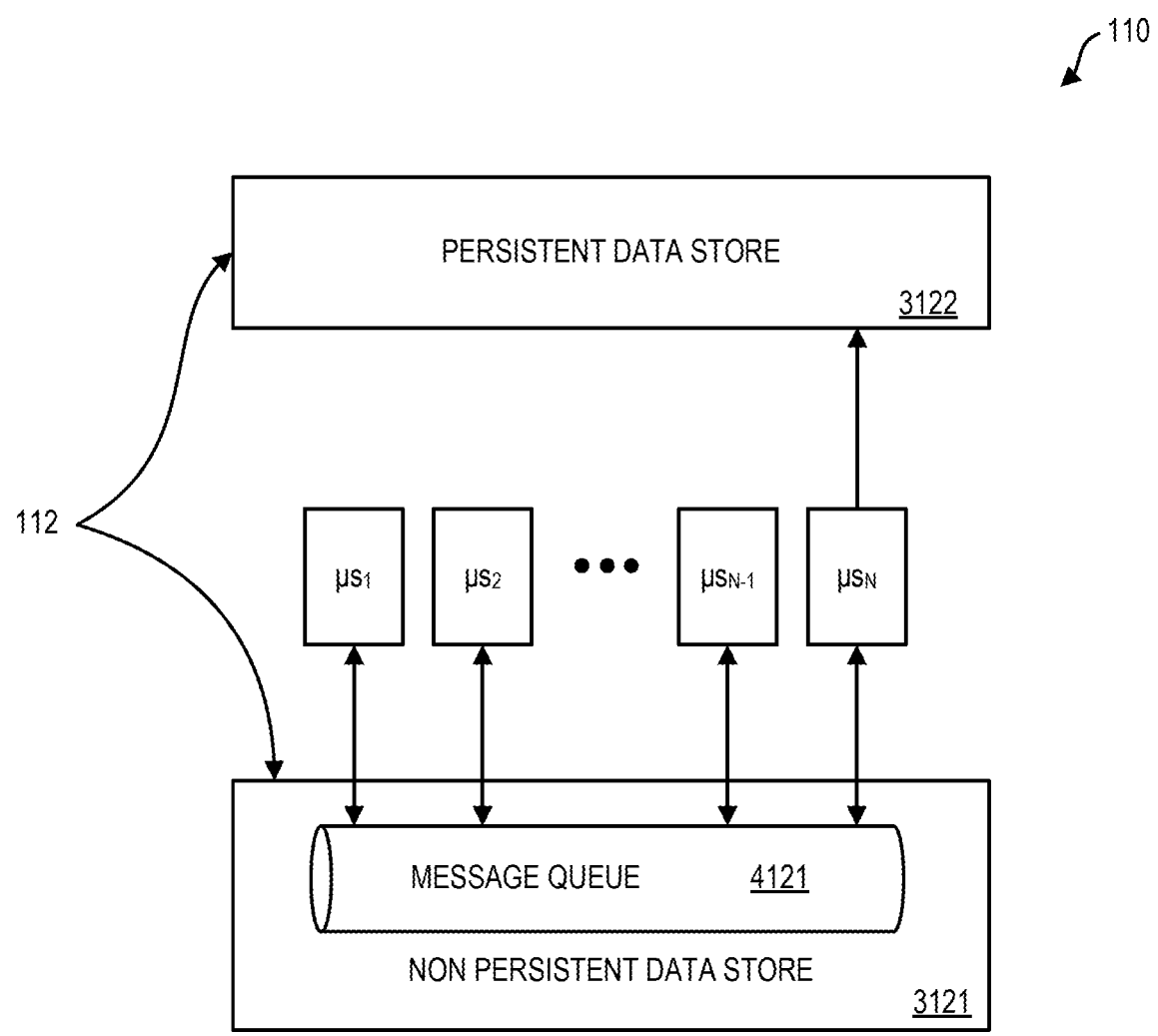
FIG. 8 is a schematic diagram of a manager system having a microservice architecture according to one embodiment.

With further reference to FIG. 8, microservice $\mu s_{N-1}$ can be configured to perform predicting functions as set forth herein, in reference to Eq. 1 having multiple factors for use in predicting that that a certain user intends to be at a location other than the actual location of the certain user. Microservice $\mu s_{N-1}$ can poll message queue 4121 for messages indicating operation by microservice $\mu s_{N-1}$ As has been explained herein, predicting functions to predict that a user intends to be in a zone other than a current zone of the user can be made active when a certain zone satisfies a triggering condition, e.g. becomes overcrowded. Thus, system 100 can be configured so that based on manager system 110 recognizing a triggering condition manager system 110 can initiate tagging of outgoing messages from venue 120 having position data with topic tags indicating that the tagged outgoing messages are to be processed by microservice $\mu s_{N-1}$ Thus, based on a trigger condition being satisfied, e.g. based on the condition being satisfied that a zone has become an "active zone" as set forth herein message queue 4121 can include messages tagged with topic tags indicating that the messages are to be operated on by microservice $\mu s_{N-1}$ Microservice $\mu s_{N-1}$ can operate on messages tagged for its operation having tag topics subscribed to by microservice $\mu s_{N-1}$. In one embodiment, a tagging scheme can be implemented so that tagging of a position data message indicating operation by microservice $\mu s_{N-1}$ results in position data transformation being performed by microservice $\mu s_{N-1}$ and transformation operations performed by microservice $\mu s_1$ or microservice $\mu s_2$ being bypassed. Microservice $\mu s_{N-1}$ on determining that user intends to be in a zone other than a current zone can transform the received position data, process the received position data and can return transformed position data back to message queue 4121 tagged for operation by another microservice. On determining using Eq. 1 that a user does not intend to be at a location other than a current location, microservice $\mu s_{N-1}$ can return a tagged message having transformed position data back to message queue 4121 indicating the zone association of a device or user e.g. transformed from an original format having alternative position data information that does not indicate a zone per se associated with a device or user identifier but may indicate e.g. a coordinate location or a beacon identifier associated with a device or user identifier.

Regarding microservice $\mu s_N$, microservice $\mu s_N$ can be a microservice that performs the limited operation of storing message data tagged for storage into persistent data store 3122 into persistent data store 3122. Manager system 110 can be configured so that position data messages stored on message queue 4121 suitable for storage in persistent data store 3122 are tagged with topic tags indicating operation by microservice $\mu s_N$. Microservice $\mu s_N$ can poll message queue 4121 for messages tagged for operation by microservice $\mu s_N$ On identification of such messages subscribed to by microservice $\mu s_N$, microservice $\mu s_N$, can retrieve such messages from message queue 4121 and can store the payload position data of such messages into persistent data store 3122. Microservice $\mu s_{N-1}$ can be configured so that when microservice $\mu s_{N-1}$ outputs messages to message queue 4121, such messages are tagged for operation by microservice $\mu s_n$ so that microservice $\mu s_N$ will store the payload data of the message into persistent data store 3122.

In one embodiment, each microservice $\mu s_1$-$\mu s_N$ can perform using a different program running on a different computer system. In one embodiment microservice $\mu s_1$ can be performed by operating of a first program running on a first processor of a first computer system, microservice $\mu s_2$ can be performed by operating of a second program running on a second processor of a second computer system, microservice $\rho s_{N-1}$ can perform by operating of a third program running on a third processor of a third computer system, and microservice $\mu s_N$ can perform by operating of a fourth program running on a fourth processor of a fourth computer system. In another embodiment microservices $\mu s_1$-$\mu s_N$ are performed using respective different programs running on a common processor of a common computer system. In another embodiment, another processing distribution is implemented.

At block 1108, manager system 110 can activate machine learning process 117 to perform machine learning. In one exemplary embodiment of block 1108, manager system 110 can monitor events at cash registers at venue 120 where the user purchases an item from a zone where the user was predicted to be. Manager system 110, at block 1108, can store such result as a positive result into results area 2123 of data repository 112. With the positive result, the weight profile of Eq. 1 used to produce the prediction is stored in a positive results area. Where a negative result is observed, e.g. where a user purchases an item from an area from a zone other than the zone predicted for the user, manager system 110 stores such result in a negative results area along with the weights profile of Eq. 1 leading to the prediction. Over time, manager system 110 can bias weights $W_1$-$W_4$ of Eq. 1, in favor of weights producing positive results indicative of correct predictions of intended position and against weights producing negative results, indicative of incorrect predictions of intended position. Accordingly, the accuracy of manager system 110 in performing predictions can be improved over time based on learned results used by system 100.

At block 1109, manager system 110 can perform providing one or more output. The one or more output can include e.g. a notification output to one or more users having computer devices 130A-130Z within venue 120 (FIG. 1). The notification can include e.g. information e.g. of a product promotion based on one or more user being specified to be at a specific location. In one embodiment, manager system 110 can activate event determining process 114 for performance of block 1109 so that one or more output is provided to one or more user based on a determined event. The one or more user can be a one or more user specified at block 1107 to have a location other than a current location of the user. For example, manager system 110 can be operative so that manager system 110 outputs a notification based on a group dwell event being determined wherein the user is part of the group and wherein the group dwell determination being based on the user being specified to be at a location other than the user's actual location. Manager system 110 can be operative so that manager system 110 outputs a notification based on an individual dwell event being determined wherein the user is an individual and wherein the individual dwell determination being based on the user being specified to be at a location other than the user's actual location. Manager system 110 can be operative so that manager system 110 outputs a notification to a user based on a zone entry event for the user being determined wherein the individual dwell event determination is based on the user being specified to be at a location other than the user's actual location. Manager system 110 can be operative so that manager system 110 outputs a notification to a user based on a zone exit event for the user being determined wherein the zone exit event determination is based on the user being specified to be at a location other than the user's actual location.

At block 1109, manager system 110 can perform providing one or more output. The one or more output can include e.g. a notification output to one or more users having computer devices 130A-130Z within venue 120 (FIG. 1). Users of computer devices 130A-130A can include e.g. patrons of a venue. Users of computer devices 130A-130A can include e.g. agents of a venue. A notification output to an agent of a venue based on a specifying being performed at block 1107 can include e.g. a notification to travel to the certain zone to provide in venue assistance to the increased number of users determine to be in the certain zone.

At block 1109, manager system 110 providing one or more output can include manager system 110 providing one or more output to activate one or more process. At block 1109, manager system 110 providing one or more output can include manager system 110 providing one or more output to activate one or more process based on a specifying at block 1107 that a user's zone association is other than a zone currently occupied by the user. Based on the specifying of such position for a user (who can be regarded to be a artificially located user) manager system can activate various processes for increasing a sensitivity of locating services within venue. Alternatively or in addition to manager system 110 sending a notification to one or more user computer device 130A-130Z at block 1109 manager system 110 can send a control communication to one or more user computer device 130A-130Z at block 1109. The control communication can include e.g. a control communication to activate a feature of a customer loyalty application (e.g. rendering a promotional game active), or a control communication to unlock digital rights, e.g. access to in venue monetary credit.

As set forth in reference to Eq. 1 various factors, e.g. factor F1, factor F2, and factor F3 on which an intended location determination is based can be in dependence on an accuracy of locating services. For increasing sensitivity of locating services, manager system 110 at block 1109 providing one or more output can include manager system 110 sending to venue system 124 a process control communication to increase a signal strength of beacons 126A, 126B, 126C (or a selected subset thereof) e.g. so that beacon signals can be received at zones outside of the zone in which the beacon is located. Increasing beacon signal strength can increase accuracy of locating services in which beacon signals are processed.

For increasing sensitivity of locating services, manager system 110 at block 1109 providing one or more output can include manager system 110 sending to venue system 124 a process control communication to activate one or more previously inactive beacon. For example, each zone e.g. can have a primary beacon e.g. as may be provided by beacon 126A as well as one or more secondary beacon located more proximate a spatial border of the beacon than the primary beacon. Each zone's secondary one or more beacon can be inactive by default, but can be activated by artificial locating of a user by manager system 110 at block 1107 by specifying that the user is associated to a zone other than the user's actually occupied zone. The one or more output provided at block 1109 can include one or more control communication that increases sensitivity of a locating service that locates a computer device of the at least one user, wherein the one or more control communication activates a previously inactive beacon so that the previously inactive beacon emits a beacon radio signal. The previously inactive beacon can be secondary normally inactive beacon within the described neighboring zone that neighbors a certain zone. Reception by a computer device e.g. computer device 130A of a beacon radio signal by a neighboring zone's secondary beacon can indicate that the computer device 130A is in a specific location within a zone, i.e. proximate the secondary beacon disposed proximate a border defining the neighboring zone.

For increasing sensitivity of locating services, manager system 110 providing one or more output at block 1109 can include manager system 110 sending to one or more computer device of computer devices a control communication to activate a software process of the receiving computer device for enhanced locating service. Such one or more software process for enhanced locating services can include e.g. a software process for increasing a radio signal sample rate so that beacon radio signals can be sampled and processed more frequently. Such one or more software process for enhanced locating services can include e.g. a software process for activating one or process for locating of one or more computer device 130A-130Z based on processing of received radio signals. For example, a computer device 130A of user computer devices 130A-130Z can be configured by default to process received beacon radio signals only to determine a coarse zone position of a computer device and not a coordinate position based on processed beacon radio signals. At block 1301 based on receipt of a control communication sent at block 1109 by manager system 110, computer device 130A can for enhanced locating services activate a process to determine coordinate position of computer device (enhancing resolution relative to a coarse zone position) based on received beacon radio signals employing e.g. received signal strength (RSSI) triangulation and/or time of fight processes.

As depicted in the flowchart of FIG. 4, providing one or more output at block 1109 can include outputting a communication to venue system 124 for receipt by venue 120 at block 1241. The communication can be e.g. a communication to provide a notification to agents of the venue or for activation of a process, e.g. a process to control one or more in venue beacon to increase a sensitivity of a locating service. Manager system 110 providing one or more output at block 1109 can include manager system 110 providing one or more output for receipt by venue system 124 at block 1241 and/or for providing one or more output for receipt by computer devices 130A-130Z at blocks 1301 and 2301 depicted in the flowchart of FIG. 4.

Embodiments herein recognize that customer tracking currently places customers into "zones" of the store based on their physical location, i.e. produce zone, deli zone. Embodiment herein recognize that sometimes, because of long lines extending out the zone's space, etc., the customer will physically be in a different zone than the one they intend to be in and the one the company wants to report them to be in. Embodiments herein recognize that the designation of a user as being at a location other that their intended location can negatively impact engagement of a user, e.g. involving e.g. all communications, digital rights.

Embodiments herein recognize that if there is an active zone where many users are entering and dwelling, the zone may not be large enough to contain them. If those people begin to dwell in adjacent zones, they will not be counted towards the zone they are actually trying to be in. This will cause skewed data.

Embodiments herein recognize that following the path created by enter, exit, and dwell events, and using historical data, it can be recognized that a user who is dwelling next to an active zone who then enters the active zone and dwells, embodiments herein can predict that they were not dwelling in the adjacent zone on purpose.

Certain embodiments herein may offer various technical computing advantages, involving computing advantages to address problems arising in the realm of computer networks such as initiated communications to networked computer devices based on specified location of the computer device. Embodiments herein can associate a computer device located at a first location to a second location and initiate communications with the computer device based on the computer device being at the second location. Thus, communications intended for a computer device used by a user who intends to be at the second location are not lost merely by the user of the second computer device being impeded from reaching the second location. A fundamental aspect of operation of a computer system is its interoperation to which it operates including human actors. By increasing the accuracy and reliability of information presented to human users, embodiments herein increase the level of engagement of human users for enhanced computer system operation. Embodiments herein can include artificial intelligence processing platforms featuring improved processes to transform unstructured data into structured form permitting computer based analytics and predictive decision making. Embodiments herein also can include machine learning platforms that leverage historical data for improved predictive analytics. Embodiments herein can employ intelligent filtering to avoid the collection of "dirty data" having "false positive" values into a persistent data store. Such intelligent filtering can improve the operation of the networked computer environment, e.g. by reducing storage overhead, alleviating interfaces to the persistent data store, reducing data access to the persistent data store, enhancing performance of and accuracy of baseline analytics processes. Reduction of interfaces and access increases speed and other performance parameters and increases data security while enhancing system reliability and maintainability. Embodiments herein can feature control communications to activate processes such as machine processes based on a determination that a user is not at an intended location. Such processes can include, e.g. processes to increase sensitivity of locating services selectively in a manner so that increased sensitivity is selectively provided at a time producing the greatest value; thus, providing increased sensitivity in a manner that conserves processing bandwidth and reduces power consumption.

Figure 9:
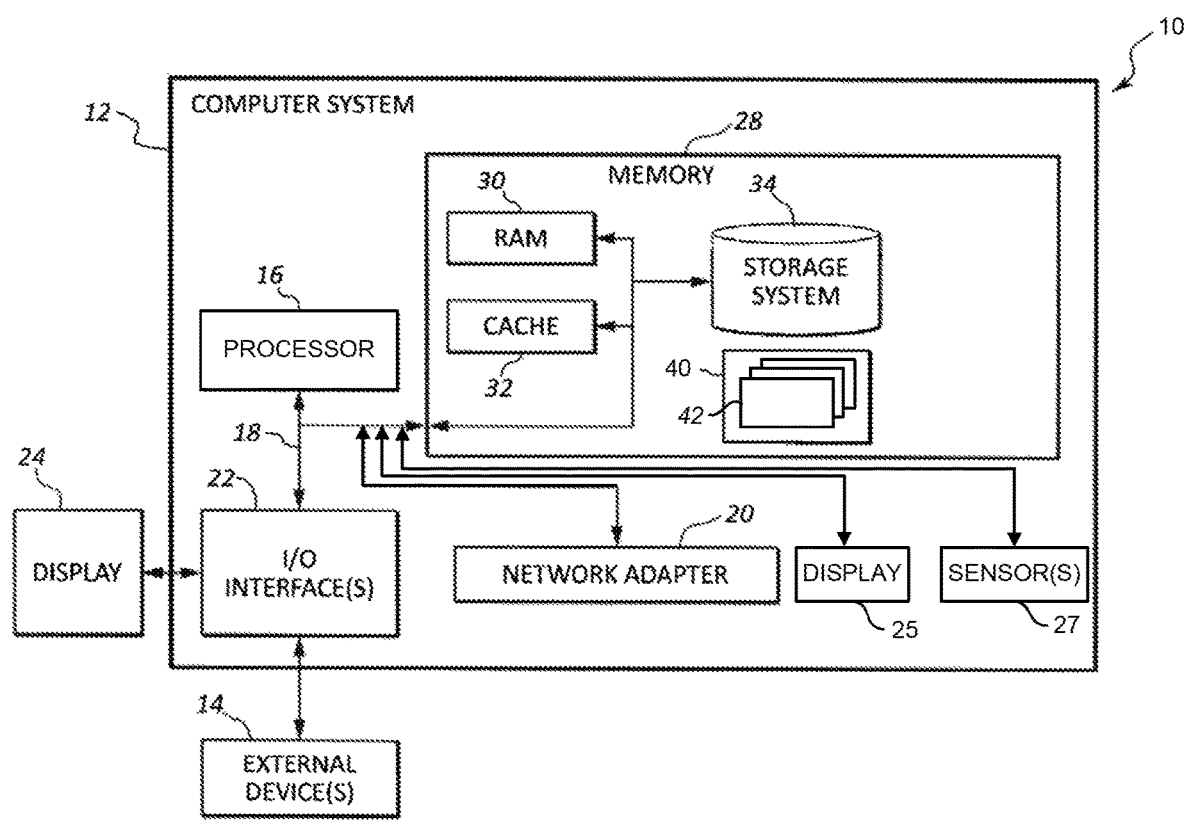
FIG. 9 depicts a computing node according to one embodiment.
Figure 10:
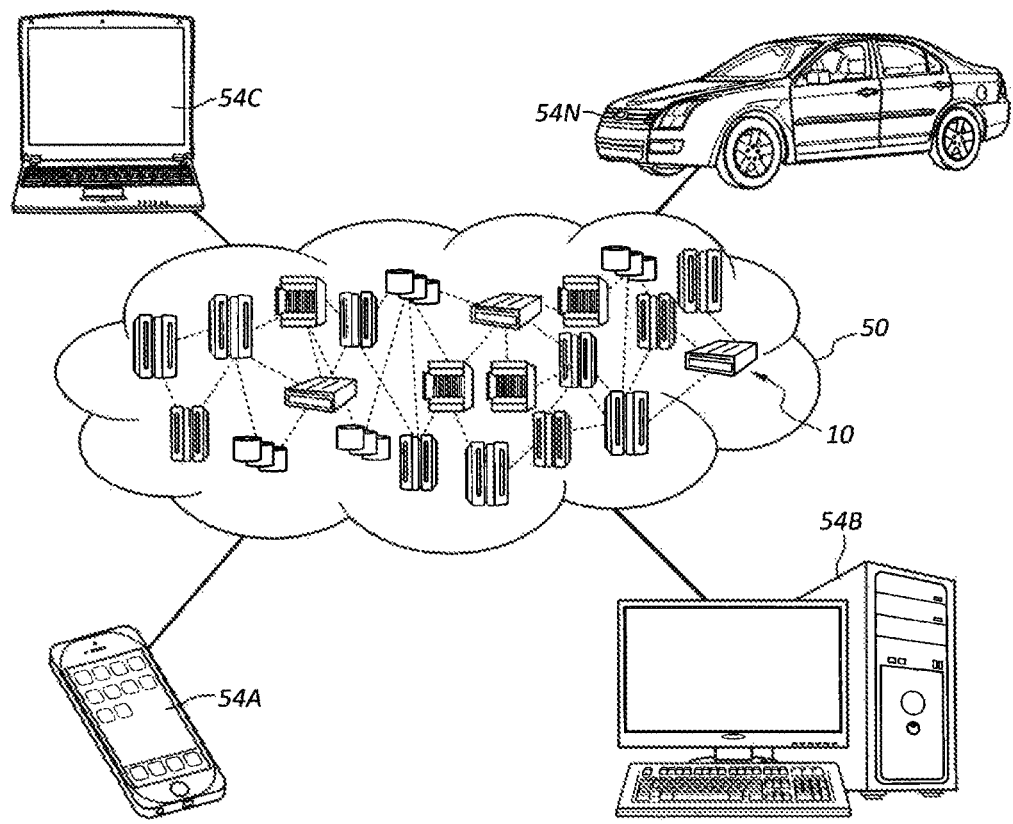
FIG. 10 depicts a cloud computing environment according to one embodiment.
Figure 11:
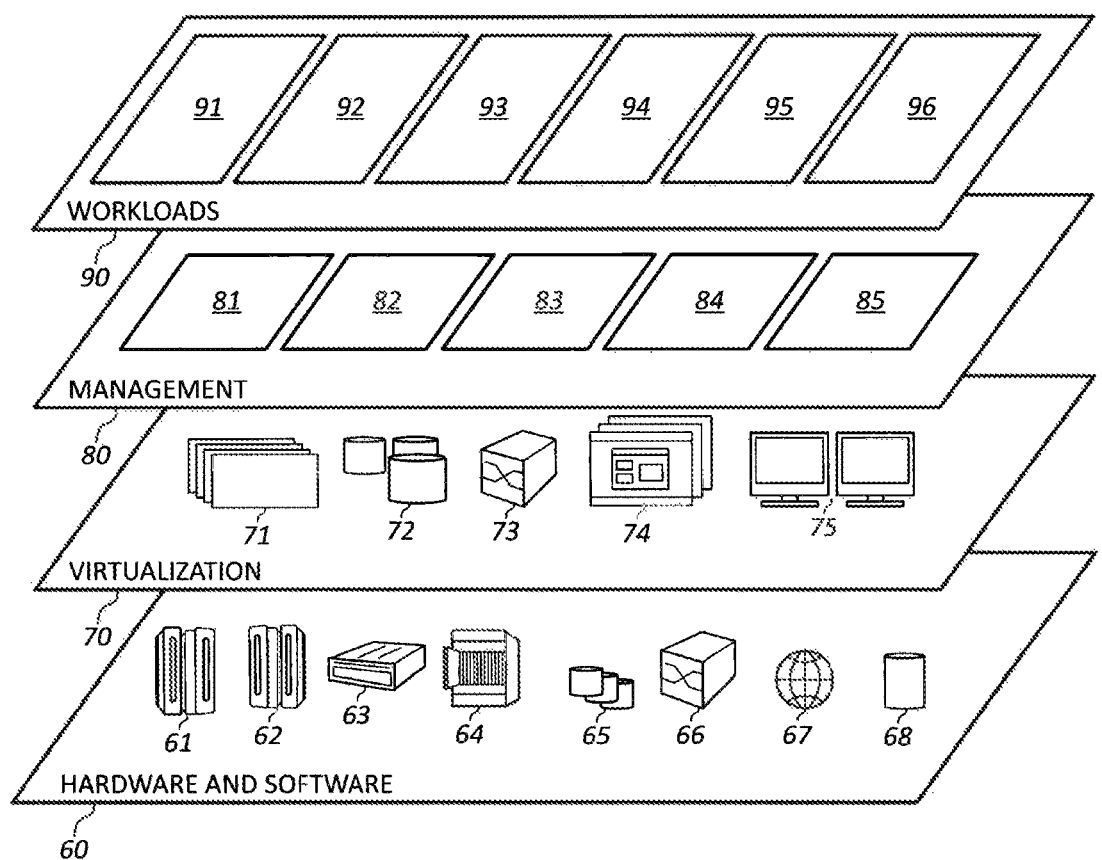
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include as part of system memory 28 other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein.

In one embodiment, manager system 110 can include one or more computing node 10 and can include one or more program 40 for performing functions described with reference to method 200 of FIG. 2, method 300 of FIG. 4, and the functions described with reference to manager system 110 as set forth in the flowchart of FIG. 4.

In one embodiment, access devices 122A-122Z can include one or more computing node 10 and can include one or more program 40 for performing functions described with reference to access devices 122A-122Z as set forth in the flowchart of FIG. 4. In one embodiment, venue system 124 can include one or more computing node 10 and can include one or more program 40 for performing functions described with reference to venue system as set forth in the flowchart of FIG. 4. In one embodiment, one or more user computer device 130A-130Z can include one or more computing node 10 and can include one or more program 40 for performing functions described with reference to one or more user computer device 130A-130Z as set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for enhanced locating services including features for determining user intended location as described herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    obtaining position data for a plurality of mobile devices, wherein mobile devices of the plurality of mobile devices have associated identifiers, and wherein the obtained position data is data that has been derived using wirelessly emitted signals;
    examining data of the position data to determine that one or more user is present within a neighboring zone of a venue, the neighboring zone being a zone that neighbors a certain zone of the venue;
    predicting that at least one user of the one or more user within the neighboring zone intends to be in the certain zone;
    specifying a zone association of the at least one user as the certain zone of the venue; and
    providing one or more output based on the specifying, wherein obtaining position data includes storing position data into a non-persistent in-memory data store, wherein the examining and predicting include using data of the position data stored in the non-persistent in-memory data store, and wherein the specifying a zone association of the at least one user as the certain zone of the venue includes storing information into a persistent data store indicating a zone association of the at least one user as the certain zone, wherein the position data includes data that has been derived by processing radio signals emitted by the plurality of mobile devices and received by access devices of the venue, wherein the position data includes data that has been derived by processing radio signals emitted by the plurality of mobile devices and received by access devices of the venue, wherein the examining and predicting are initiated based on a condition being satisfied, wherein the condition is that the certain zone satisfies one or more criterion indicating that the certain zone has become crowded.

2. The method of claim 1, wherein the predicting is based on a preference history of the at least one user of the one or more user within the neighboring zone, and wherein the predicting is based on a flow factor, the flow factor being a factor in dependence on a flow of users from the neighboring zone to the certain zone.

3. The method of claim 1, wherein the one or more output includes a control communication sent to a mobile device of the at least one user to activate a function of an application running on the mobile device, and wherein the one or more output includes a notification to the at least one user.

4. The method of claim 1, wherein the predicting is initiated based on a condition being satisfied, wherein the condition is that the certain zone satisfies one or more criterion indicating that the certain zone has become crowded, wherein the one or more output includes a control communication for controlling functioning of service that locates a mobile device of the at least one user.

5. The method of claim 1, wherein the predicting is initiated based on a condition being satisfied, wherein the condition is that the certain zone satisfies one or more criterion indicating that the certain zone has become crowded, wherein the one or more output includes a notification to the at least one user.

6. The method of claim 1, wherein the examining and predicting are performed in dependence on the position data, wherein the one or more output includes a control communication that controls functioning of a locating service that locates a mobile device of the at least one user.

7. The method of claim 1, wherein the examining and predicting are performed in dependence on the position data, wherein the one or more output includes a notification to the at least one user.

8. The method of claim 1, wherein the examining and predicting are initiated based on a condition being satisfied, wherein the one or more output includes a control communication that controls functioning of a service that locates a mobile device of the at least one user.

9. The method of claim 1, wherein the one or more output includes a control communication that increases sensitivity of a locating service that locates a mobile device of the at least one user.

10. The method of claim 1, wherein the one or more output includes a control communication sent to a mobile device of the user to activate a function of an application running on the mobile device.

11. The method of claim 1, wherein the one or more output includes a control communication sent to a mobile device of the user to activate a function of an application running on the mobile device, wherein the one or more output includes a control communication that controls functioning of a locating service that locates a mobile device of the at least one user.

12. The method of claim 1, wherein the one or more output includes a control communication that activates on a mobile device of the at least one user a previously inactive mobile device locating process, the previously inactive mobile device locating process being a process that processes received radio signals received from a plurality of different beacons within the venue.

13. The method of claim 1, wherein obtaining position data includes storing position data into a non-persistent in-memory data store having a message queue, wherein the predicting includes using data of the position data stored in the non-persistent in-memory data store, wherein the predicting is performed using a microservice that processes tagged messages of the message queue that are tagged with topic tags indicating operation by the microservice.

14. The method of claim 1, wherein the examining and predicting are initiated based on a condition being satisfied, wherein the condition is that the certain zone satisfies one or more criterion indicating that the certain zone has become crowded.

15. The method of claim 1, wherein the method includes at the venue tagging outgoing messages for a message queue with topic tags indicating operation by a microservice, and wherein the specifying a zone association of the at least one user as the certain zone of the venue includes storing information into a persistent data store, the information indicating a zone association of the at least one user as the certain zone.

16. The method of claim 1, wherein obtaining position data includes storing position data into a non-persistent in-memory data store, wherein the examining and predicting include using data of the position data stored in the non-persistent in-memory data store, and wherein the specifying a zone association of the at least one user as the certain zone of the venue includes storing information into a persistent data store indicating a zone association of the at least one user as the certain zone.

17. The method of claim 1, wherein the position data includes data that has been derived by processing radio signals emitted by the plurality of mobile devices and received by access devices of the venue, wherein the position data includes data that has been derived by processing radio signals emitted by the plurality of mobile devices and received by access devices of the venue, wherein the examining and predicting are initiated based on a condition being satisfied, wherein the condition is that the certain zone satisfies one or more criterion indicating that the certain zone has become crowded.

18. A computer program product comprising:
a computer readable storage medium readable by one or more processing circuit and storing instructions for execution by one or more processor for performing a method comprising:
obtaining position data for a plurality of mobile devices, wherein mobile devices of the plurality of mobile devices have associated identifiers, and wherein the obtained position data is data that has been derived using wirelessly emitted signals;
examining data of the position data to determine that one or more user is present within a neighboring zone of a venue, the neighboring zone being a zone that neighbors a certain zone of the venue;
predicting that at least one user of the one or more user within the neighboring zone intends to be in the certain zone;
specifying a zone association of the at least one user as the certain zone of the venue; and
providing one or more output based on the specifying, wherein obtaining position data includes storing position data into a non-persistent in-memory data store, wherein the examining and predicting include using data of the position data stored in the non-persistent in-memory data store, and wherein the specifying a zone association of the at least one user as the certain zone of the venue includes storing information into a persistent data store indicating a zone association of the at least one user as the certain zone, wherein the position data includes data that has been derived by processing radio signals emitted by the plurality of mobile devices and received by access devices of the venue, wherein the position data includes data that has been derived by processing radio signals emitted by the plurality of mobile devices and received by access devices of the venue, wherein the examining and predicting are initiated based on a condition being satisfied, wherein the condition is that the certain zone satisfies one or more criterion indicating that the certain zone has become crowded.

19. A system comprising:
a memory;
at least one processor in communication with the memory; and
program instructions executable by one or more processor via the memory to perform a method comprising:
obtaining position data for a plurality of mobile devices, wherein mobile devices of the plurality of mobile devices have associated identifiers, and wherein the obtained position data is data that has been derived using wirelessly emitted signals;
examining data of the position data to determine that one or more user is present within a neighboring zone of a venue, the neighboring zone being a zone that neighbors a certain zone of the venue;
predicting that at least one user of the one or more user within the neighboring zone intends to be in the certain zone;
specifying a zone association of the at least one user as the certain zone of the venue; and
providing one or more output based on the specifying, wherein obtaining position data includes storing position data into a non-persistent in-memory data store, wherein the examining and predicting include using data of the position data stored in the non-persistent in-memory data store, and wherein the specifying a zone association of the at least one user as the certain zone of the venue includes storing information into a persistent data store indicating a zone association of the at least one user as the certain zone, wherein the position data includes data that has been derived by processing radio signals emitted by the plurality of mobile devices and received by access devices of the venue, wherein the position data includes data that has been derived by processing radio signals emitted by the plurality of mobile devices and received by access devices of the venue, wherein the examining and predicting are initiated based on a condition being satisfied, wherein the condition is that the certain zone satisfies one or more criterion indicating that the certain zone has become crowded.

20. The system of claim 19, wherein the method includes at the venue tagging outgoing messages for a message queue with topic tags indicating operation by a microservice, and wherein the specifying a zone association of the at least one user as the certain zone of the venue includes storing information into a persistent data store, the information indicating a zone association of the at least one user as the certain zone.

\* \* \* \* \*